United States Patent
Gämmerler et al.

(10) Patent No.: US 7,628,575 B2
(45) Date of Patent: Dec. 8, 2009

(54) STACK GRIPPER WITH EXPULSION AND SPACING ACCOMMODATION

(75) Inventors: Gunter Gämmerler, Gelting (DE); Ronald Meisel, Kochel am See (DE); Eckhard Müller, Starnberg (DE); Ralf-Peter Schubart, Kochel am See (DE)

(73) Assignee: Gammerler AG, Gelting (DE)

( * ) Notice: Subject to any disclaimer, the term of this patent is extended or adjusted under 35 U.S.C. 154(b) by 254 days.

(21) Appl. No.: 11/611,636

(22) Filed: Dec. 15, 2006

(65) Prior Publication Data

US 2007/0154292 A1    Jul. 5, 2007

(30) Foreign Application Priority Data

Dec. 20, 2005    (DE)    ........................ 10 2005 060 946

(51) Int. Cl.
*B65H 31/30*    (2006.01)
*B65F 9/00*    (2006.01)
*B66F 9/14*    (2006.01)
*B66C 1/42*    (2006.01)

(52) U.S. Cl. .................... 414/790.2; 414/349; 414/622; 414/662; 294/103.1

(58) Field of Classification Search ................. 198/409, 198/468.9; 271/299; 294/103.1, 113, 119.1, 294/67.22, 902; 414/349, 351–353, 622, 414/662, 744.1, 744.6, 744.8, 763, 783, 785, 414/789.1, 789.7, 789.9, 790.2, 790.3, 792.1, 414/792.8, 792.9, 799, 907, 739–740, 791.6, 414/790.8, 226.01, 226.02, 225.01, 753.1, 414/667, 671; 901/39

See application file for complete search history.

(56) References Cited

U.S. PATENT DOCUMENTS

| | | | | |
|---|---|---|---|---|
| 2,985,328 | A | | 5/1961 | Fitch |
| 3,131,819 | A | * | 5/1964 | Ducayet, Jr. ............. 414/790.4 |
| 3,977,671 | A | * | 8/1976 | Taylor et al. ................. 271/221 |
| 4,588,070 | A | * | 5/1986 | Smith ....................... 198/468.3 |
| 5,271,706 | A | * | 12/1993 | Helbach et al. ............. 414/676 |
| 5,562,403 | A | * | 10/1996 | Winski ........................ 414/799 |
| 5,628,539 | A | * | 5/1997 | Muchalov et al. .......... 294/86.4 |
| 5,827,039 | A | * | 10/1998 | Gammerler .............. 414/744.6 |
| 6,106,219 | A | * | 8/2000 | Newsome et al. ........ 414/790.6 |
| 6,129,504 | A | | 10/2000 | Gammerler et al. |

(Continued)

FOREIGN PATENT DOCUMENTS

AT    342500    4/1978

(Continued)

OTHER PUBLICATIONS

European Search Report for European Patent Application No. 06022841.8-2308 dated Apr. 13, 2007.

(Continued)

*Primary Examiner*—Gregory W Adams
(74) *Attorney, Agent, or Firm*—Fitch, Even, Tabin & Flannery

(57) ABSTRACT

A stack gripper has two pairs of support elements, which are arranged next to one another and are adjustably fastened to a transverse carrier. A drive is provided for an adjustment apparatus, with which the spacing between the two pairs can be changed without the lateral spacing of the support elements of a pair being changed.

7 Claims, 2 Drawing Sheets

U.S. PATENT DOCUMENTS

| | | |
|---|---|---|
| 6,871,893 B2 * | 3/2005 | Langston et al. ............ 294/113 |
| 2004/0051328 A1 * | 3/2004 | Cinotti et al. ............ 294/119.1 |
| 2005/0049131 A1 * | 3/2005 | Andolfi ...................... 493/434 |
| 2005/0089389 A1 * | 4/2005 | Cawley ...................... 414/796 |

FOREIGN PATENT DOCUMENTS

| | | |
|---|---|---|
| DE | 3420005 A1 | 12/1985 |
| DE | 3736759 A1 | 5/1989 |
| DE | 19626802 A1 | 1/1998 |
| DE | 10154842 A1 | 5/2003 |
| EP | 0540931 A1 | 5/1993 |
| EP | 1 155 984 A1 | 4/2001 |
| EP | 1348651 A2 | 10/2003 |
| FR | 2322085 | 3/1977 |

OTHER PUBLICATIONS

Search Report from counterpart German Patent Application No. 10 2005 060946.5 dated Dec. 20, 2005.

* cited by examiner

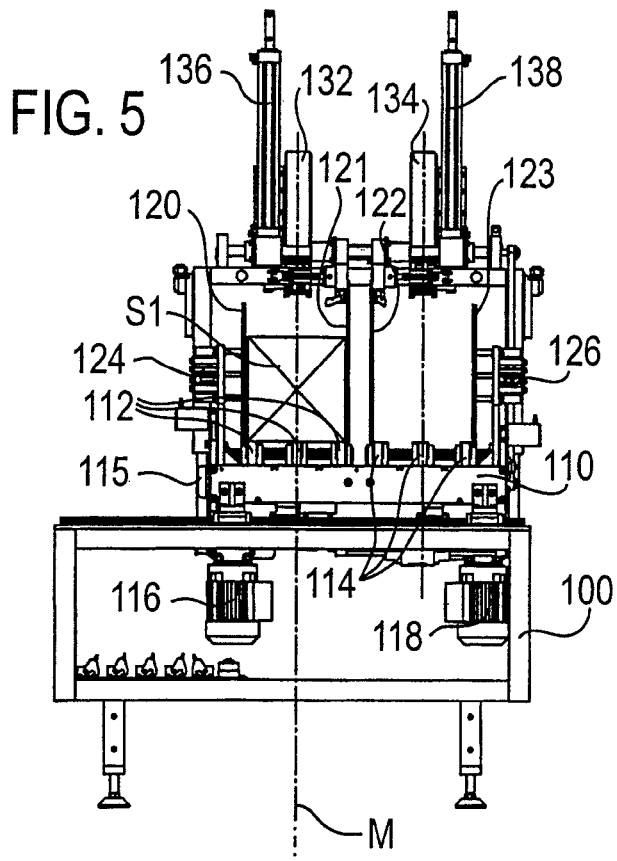
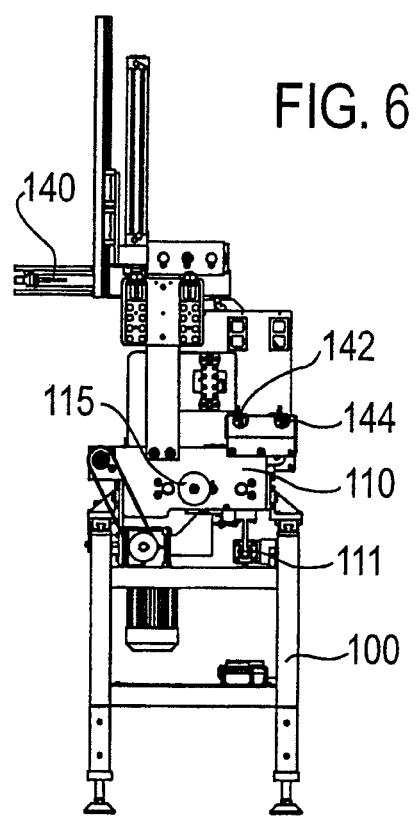
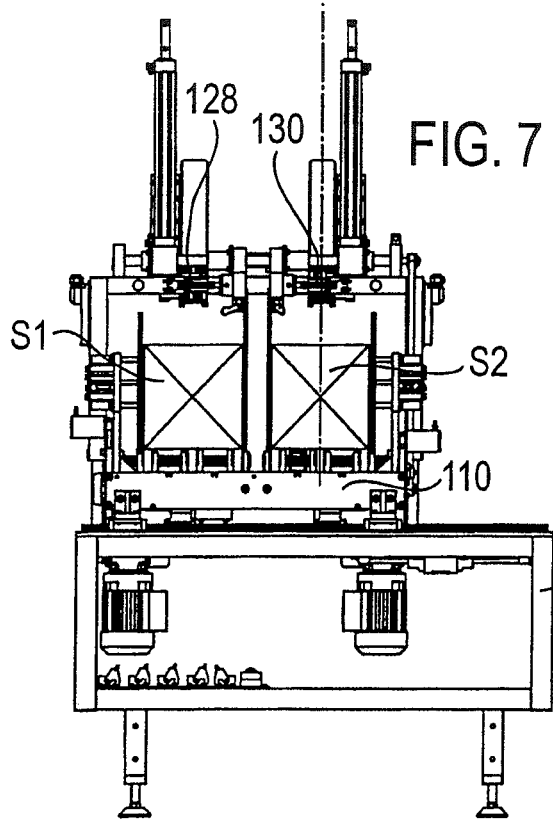
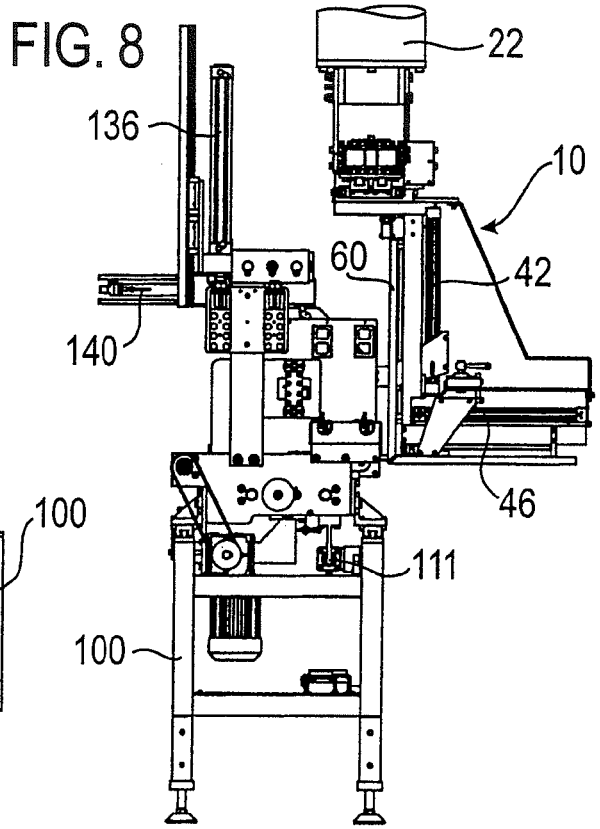

STACK GRIPPER WITH EXPULSION AND SPACING ACCOMMODATION

CROSS-REFERENCE TO RELATED APPLICATION

This application claims the benefit of German Patent Application No. 10 2005 060 946.5, filed Dec. 20, 2005, the disclosure of which is incorporated by reference as if reproduced entirely herein.

FIELD OF THE INVENTION

The present invention relates to a stack gripper, in particular for unbound, printed products.

BACKGROUND OF THE INVENTION

The statements in this section merely provide background information related to the present disclosure and may not constitute prior art.

Stack grippers of the above-describe type typically include a first pair and a second pair of support elements which are arranged next to one another and are adjustably fastened to a transverse carrier. Such a stack gripper is known, for example, from U.S. Pat. No. 6,871,893 B2.

SUMMARY OF THE INVENTION

It is the object of the present invention to improve a stack gripper of the above-named kind such that a space-saving palletization is possible with a gentle treatment of the products and while utilizing the available basic pallet area to the largest possible extent.

This object is satisfied in particular in that an adjustment apparatus is provided which has a drive with which the spacing between the two pairs of support elements arranged next to one another can be changed without the lateral spacing of the support elements of a pair being changed.

So-called double stacks, i.e. two stacks of unbound printed products arranged next to one another, can be handled with the stack gripper in accordance with the invention, with it being possible due to the drive to move the two stacks spaced apart from another toward one another after they have been gripped until the spacing between the two stacks has been eliminated. Since the two support elements located beneath a stack are not displaced relative to one another in this process, each stack remains intact.

It is possible with the stack gripper in accordance with the invention, for example after gripping the stack and during the transfer of the stack to a pallet, to eliminate the spacing between the two stacks so that the available space is utilized in the best possible manner on the placement of the double stack on the pallet.

Advantageous embodiments of the invention are described in the description, in the drawings and in the dependent claims.

In accordance with a first advantageous embodiment, the support elements of one pair can be manually adjustably fastened to one crossbeam, with the crossbeam being movable by the drive in each case in the direction of the other pair or in the direction of the other crossbeam. This embodiment, on the one hand, represents a solution which is simple in construction and so cost-effective. On the other hand, it is ensured in a simple manner that stacks with different formats can also be reliably handled since the support elements of one pair are manually adjustably fastened to the crossbeam, i.e. the relative spacing of two adjacent support elements of one pair is adjustable.

In accordance with a further advantageous embodiment, a vertically adjustable pressing element is provided between the support elements of a respective pair. The stack of printed products, in particular unbound printed products, can be fixed from above using such a pressing element so that the stack gripper can be moved in the direction of the pallet or in the direction of the delivery position at comparatively high speeds.

In accordance with a further advantageous embodiment, a guidance of such a pressing element is integrated into a holder of a support element. No separate construction has to be provided for the holder of the pressing element in this manner.

Provided the support elements have flexible support bands which roll off at the front end of the support elements, a particularly gentle handling of the stacks is ensured since no relative movement takes place between the stack and the stack support when the support elements are withdrawn to place the stack down.

In accordance with a further advantageous embodiment, a rear stop is provided for the printed products, with a sensor detecting an abutment of printed products at the stop. It is reliably ensured with this embodiment that the stack of printed products is moved up to the rear end of the support elements before a pressing element fixes the stack from above. At the same time, a very fast procedure is possible with this embodiment since the support elements can be lowered immediately when the sensor emits a signal.

In a method in accordance with the invention for palletization using a stack gripper described above, a respective stack of printed products is put onto a pair of support elements and subsequently the two pairs are moved toward one another with the help of the drive of the adjustment apparatus after a vertically adjustable pressing element has been lowered onto the upper side of each stack. It is ensured in this manner that every single stack is first fixed and then the spacing between the two stacks is eliminated. The drive can then be actuated in an advantageous manner when the stack gripper is moved with the help of a manipulator, for example a robot arm, from a transfer position into a placement position.

In accordance with a further advantageous variant of the method, the vertically adjustable pressing element is pressed more strongly onto the stack during the movement of the manipulator or of the stack gripper than in the placement position in which the support elements under the stack are withdrawn. It is ensured with this procedure that the individual printed products of the stacks are not displaced during the movement of the stack gripper and that a gentle putting down of the stacks on the pallet or on the already arranged stacks can take place.

In accordance with a further aspect of the invention, it relates to a transfer unit for a stack gripper of the type described above, with this transfer unit having a displacement unit on which a carriage is horizontally displaceably arranged. At least two placement means for a respective stack are provided next to one another on the carriage and an expulsion apparatus is furthermore arranged on the carriage which makes possible an expulsion of stacks located on the placement means onto the support elements of the stack gripper.

It is possible using this transfer unit in accordance with the invention to form stacks of paper products supplied from a conveyor line into a double stack and to subsequently transfer it to the stack gripper. For this purpose, an incoming stack is first arranged on a placement means and the carriage is subsequently horizontally displaced so that the following supplied stack can be arranged on the adjacent placement means. Subsequent to this, the two stacks can be expelled from the expulsion device onto the support elements of the stack gripper.

In accordance with an advantageous embodiment, the placement means can comprise conveyor belts arranged parallel next to one another to transfer the stacks from the transfer unit to the stack gripper.

In accordance with a further advantageous embodiment, at least one vertically and horizontally movable expeller is provided which supports the expulsion process. Due to the vertical movement capability of the expeller, it can be installed above the placement means and can be lowered horizontally for the expulsion.

In accordance with a further advantageous embodiment, two respective pressing elements which can be moved toward one another or can be laterally delivered are provided on the carriage for each stack. A single stack can be aligned laterally with these pressing elements and can in particular also be held tight when the carriage is displaced laterally.

In accordance with a further advantageous embodiment, a braking path bounded by a first sensor and a second sensor can be provided on the carriage and the conveyor belts are driven at reduced speed in said braking path. Such a braking path permits a high movement speed since the stack can first be conveyed with the conveying line into the transfer unit and is only braked to a very low speed when the braking path is reached and is stopped when the end of the braking path is reached.

In accordance with a further advantageous embodiment, the spacing between the placement means can be adjusted, in particular manually adjusted, by an adjustment element such that a format setting is also possible in the region of the transfer unit.

In a method in accordance with the invention for the transfer of at least two stacks arranged next to one another from a transfer unit described above to a stack gripper described above, a stack of printed products is first conveyed to a placement means. Subsequently, a further stack of printed products is conveyed onto a further placement means and subsequently both stacks are simultaneously moved onto the support elements of the stack gripper by the expulsion device. In this manner, not only are double stacks formed in a very short time, but they are also transferred to the stack gripper.

It is advantageous for the stack first conveyed onto the carriage to be held tight by two pressing elements during the movement of the carriage in order to avoid damage to the stack or a displacement of the individual printed products. It is likewise advantageous for the further stack to be aligned by lateral pressing elements prior to the actuation of the expulsion device to ensure that the stack is kept as straight as possible.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a front view of a transfer unit;
FIG. 6 is a side view of the transfer unit of FIG. 5;
FIG. 7 is a front view corresponding to FIG. 5 after displacement of the carriage;
and
FIG. 8 is a side view corresponding to FIG. 6 with a stack gripper in the transfer position.

DETAILED DESCRIPTION OF THE PREFERRED EMBODIMENTS

Figure 1:
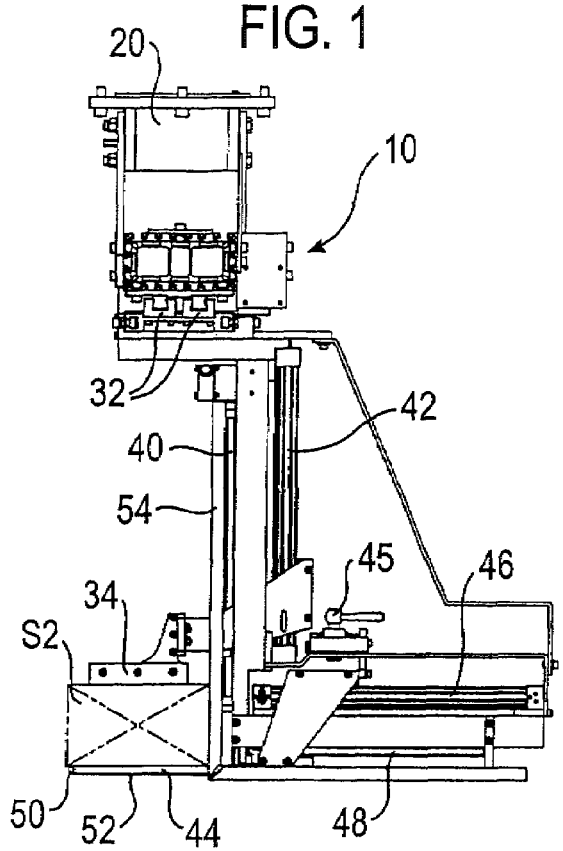
FIG. 1 is a side view of a stack gripper.

The following description is merely exemplary in nature and is not intended to limit the present disclosure, application, or uses. It should be understood that throughout the drawings, corresponding reference numerals indicate like or corresponding parts and features.

The stack gripper 10 shown in FIGS. 1 to 4 has a first pair of support elements 11 and 12 arranged next to one another and a second pair of support elements 14 and 16 arranged next to one another, with the two pairs of support elements being adjustably fastened to a transverse carrier 18 via vertical carriers 13, 19, 15 and 17. The transverse carrier 18 is in turn fastened to a gripper flange 20 with which the stack gripper 10 can be installed at a robot arm 22 (cf. FIG. 8).

Each pair of support elements 11, 12 and 14, 16 is manually adjustably fastened to an associated crossbeam 24 and 26 to ensure a format adjustment. In this connection, each crossbeam 24 and 26 is horizontally displaceable along the transverse carrier 18 by an adjustment device such that the two pairs of support elements can be moved toward one another and away from one another without the relative spacing or the lateral spacing of the support elements 11 and 12 or 14 and 16 changing.

The adjustment device has a drive in the form of two pneumatic cylinders 28 and 30 (cf. FIG. 3) to displace the two crossbeams 24 and 26 along a linear guide 32 which is fastened to the transverse carrier 18.

A vertically adjustable pressing element 34 and 36 respectively is provided between two respective support elements 11, 12 and 14, 16 of a pair and is in each case vertically adjustable in a linear guide 38, 40 by a pneumatic cylinder 42 (cf. FIG. 1).

The support elements 11 to 16 each comprise a support finger 44 which is horizontally movable via a linear guide 48 with the help of a pneumatic cylinder 46. A guide pulley 50 is provided in each case at the front end and at the rear end of the support fingers 44 (only the front guide pulley 50 can be recognized in the Figures) around which a respective thin flat belt 52 is guided whose two free ends are fixed to the gripper. The pneumatic cylinder 46 is withdrawn to withdraw the support fingers 44, with the flat belt 52 rolling off over the guide pulleys 50 so that no relative movement takes place between the upper run of the flat belt 52 and the stack. A format adjustment of the support fingers 44 can take place with the help of a clamping lever 45.

Finally, a stop plate 54, 56, 58 and 60 is provided at each carrier 13, 19, 15 and 17 and serves in each case as a rear stop for the stacks S1 and S2 located on the support elements 11 to 16. Furthermore, a sensor 62 in the form of a laser reflection light barrier is provided on the carrier 19 and detects an abutment of printed products, i.e. an abutment of the stack S1 at the stop plates 54 and 56. In the same way, a laser reflection light barrier 64 is fastened to the carrier 15 and detects an abutment of the stack S2 at the stop plates 58 and 60.

FIGS. 5 to 8 show a transfer unit for the stack grippers described above which serves, on the one hand, to form double stacks from stacks of print shop products supplied in a single conveyor line and subsequently to transfer these double stacks to the stack gripper. FIG. 8 shows a side view of the transfer unit, with the stack gripper 10, which was described above, having been moved by means of an only indicated robot arm 22 into the take-over position in which the formed double stacks can be taken over.

As FIGS. 5 to 8 show, the preferred embodiment of a transfer unit has a base rack 100 on which a carriage 110 is horizontally displaceable by means of a pneumatic cylinder 111 from the right hand position shown in FIG. 5 into the left hand position shown in FIG. 7. Two placement means for a respective stack S1 and S2 are provided parallel next to one another and, in the embodiment shown, each comprise three transport belts 112 and 114, with the transport belts 112 being driven by a motor 116 and the transport belts 114 being driven by a motor 118. As can be recognized, the stack S1 can be placed on the placement formed by the transport belts 112, whereas the stack S2 (cf. FIG. 7) can be placed on the transport bands 114. The relative horizontal position of the individual transport belts 112 and 114 on the carriage 110 can be set with the help of a hand wheel 115 for the format adjustment.

Two respective pressing plates 120, 121 and 122 and 123 respectively are arranged at both sides of both placement means 112 and 114. The two outermost pressing plates 120 and 123 can be moved in the direction of the stacks by pneumatic cylinders 124 and 126, while the two inner pressing plates 121 and 122 can be moved in the direction of the stacks by pneumatic cylinders 128 and 130 arranged above the pressing plates (cf. FIG. 7).

Furthermore, an expulsion device can be recognized in FIGS. 5 and 7, which has two ejector plates 132 and 134 which can each be displaced vertically via a pneumatic cylinder 136 and 138. Furthermore, both expulsion plates 132 and 134 are horizontally movable in the expulsion direction via a respective pneumatic cylinder 140 (cf. FIGS. 6 and 8).

Furthermore, a braking path is provided on the carriage 110 which is bounded by a first light barrier 142 (cf. FIG. 6) and a second light barrier 144. These two light barriers sense the moving in of a stack separately for each support, with the stack being braked on the passing of the light barrier 142 and being stopped on reaching the light barrier 144.

In FIGS. 5 and 7, the central axis of an incoming conveyor line is shown in a chain-dotted line and is designated by the reference numeral M. As can be recognized, the line M, i.e. the central axis of the incoming conveyor line, in each case extends through the centre of the two placement means when the carriage is located in its two end positions.

The operation of the transfer unit described above and of the stack gripper described above will be described in the following, with it being remarked that the stacks S1 and S2 shown in FIGS. 1 to 4 and 5 to 8 are shown in different sizes for drawing reasons, but that they are in reality the same stacks.

With reference to FIG. 5, a first stack S1 is first conveyed by an incoming individual conveyor line (not shown) into the transfer unit and the stack S1 is taken over by the transport belts 112 and is transported on at the speed of the conveyor line up to the first light barrier 142. On the reaching of this first light barrier 142, the speed of the transport belts is greatly reduced and the stack S1 is conveyed at this low speed up to the second light barrier 144. The stack is stopped, i.e. the transport belts 112 are stopped, when this second light barrier is reached.

The stack S1 located on the support formed by the transport belts 112 can now be laterally aligned with the help of the pressing plates 120 and 121 and can be held tight in that the pneumatic cylinders 124 and 128 (FIG. 7) are activated. The total unit located on the carriage 110 is subsequently displaced into the position shown in FIG. 7, with the pressing plates 120 and 121 remaining set to the stacks S1. The centre of the support formed by the transport belts 114 is in turn located on the center line M of the incoming conveyor line in the left hand end position of the carriage 110 so that a following stack S2 can move into the transfer unit and can be taken over by the transport belts 114. Subsequently, the stack S2 is aligned by the pressing plates 122 and 123 in that the pneumatic cylinders 130 and 126 are actuated.

Figure 2:
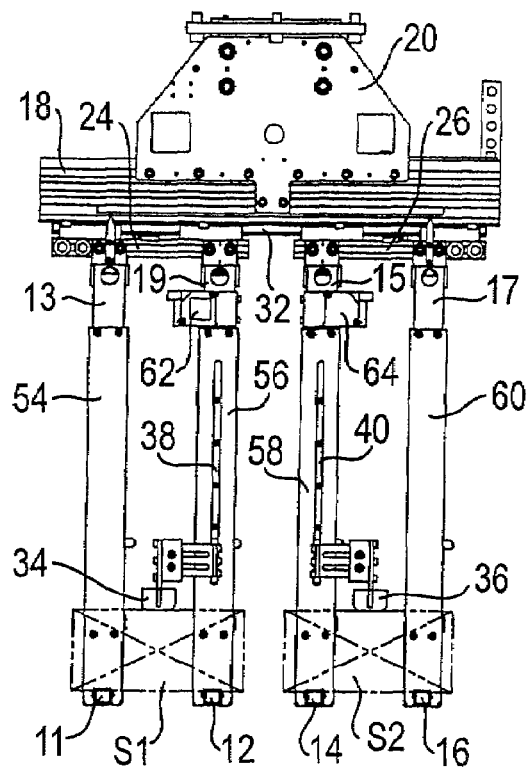
FIG. 2 is a front view of the stack gripper of FIG. 1.
Figure 3:
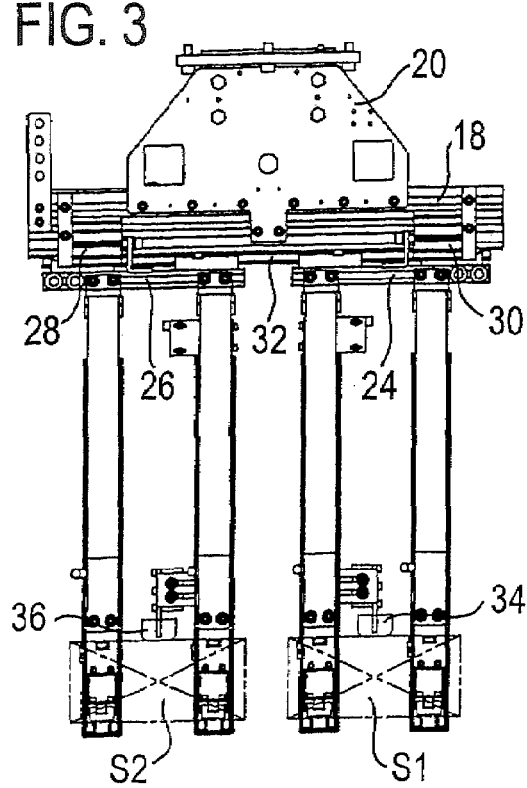
FIG. 3 is a rear view of the stack gripper of FIG. 1.
Figure 4:
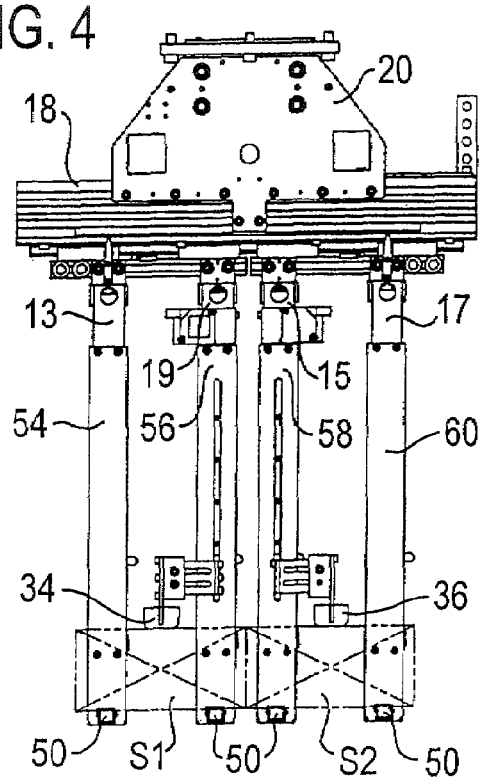
FIG. 4 is a front view corresponding to FIG. 2 after actuation of the drive.

In the following step, the expulsion plates 132 and 134 are lowered downwardly by actuation of the pneumatic cylinders 136 and 138, whereupon the two stacks S1 and S2 can be handed over to the stack gripper 10 by actuation of the pneumatic cylinders 140, said stack gripper having previously been moved into the matching transfer position by the robot arm 22. The pressing plates 120 to 123 are slightly withdrawn prior to this procedure so that they no longer hold the two stacks S1 and S2 tight, but provide a guidance. At the same time, the transport belts 112 and 114 are moved in the transfer process to prevent a relative movement between the two stacks S1 and S2 and the transport belts. On the transfer of the two stacks S1 and S2, it is monitored by the sensors 62 and 64 (FIG. 2) when the stacks have reached the stop plates 54, 56 or 58 and 60. If this is the case, the pressing elements 34 and 36 are lowered by activation of the pneumatic cylinders 42 so that the position shown in FIGS. 1 to 3 is present.

After the pressing elements 34 and 36 have been pressed against the stacks S1 and S2 with increased pressure, the stack gripper 10 can be moved in the direction of the delivery position above a pallet by the robot arm 22. During this movement, the pneumatic cylinders 28 and 30 are activated so that the two crossbeams 24 and 26 can be moved toward one another, whereby the intermediate space between the two stacks S1 and S2 is eliminated.

The pressing pressure of the pressing elements 34 and 36 is reduced above the delivery position and the pneumatic cylinders 46 are activated so that the lower run of the flat belts 52 can be withdrawn, with the support fingers 44 likewise being displaced to the rear. After the support fingers 44 have been completely withdrawn, the stack gripper can again be moved in the direction of the transfer unit by the robot arm 22.

It is self-explanatory that the construction components named in the preferred embodiment described above are only named by way of example. Instead of the pneumatic cylinders, other adjustment elements can thus be used, for example, and the support does not necessarily have to comprise transport belts.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transfer unit for a stack gripper, the transfer unit comprising:
   a displacement unit, on which a carriage is horizontally displaceably arranged, and on which at least two placement means are provided for one respective stack in each case next to one another in a lateral direction; and
   an expulsion device, which is arranged on the carriage, and which permits an expulsion of stacks located on the placement means onto support elements of the stack gripper, wherein the spacing between the placement means in the lateral direction can be set by an adjustment element that is operable to shift the two placement means in the lateral direction relative to each other.

2. A transfer unit in accordance with claim 1, wherein the placement means comprise transport belts arranged parallel next to one another.

3. A transfer unit in accordance with claim 2, wherein a braking path is provided on the carriage which is bounded by a first sensor and a second sensor and in which the transport belts are driven at reduced speed.

4. A transfer unit in accordance with claim 1, wherein the expulsion device comprises at least one vertically and horizontally movable expeller.

5. A transfer unit in accordance with claim 1, wherein two respective laterally deliverable pressing elements are provided on the carriage for each stack.

6. A method for the transfer of at least two stacks of printed products, comprising:

arranging at least two stacks next to one another using a transfer unit;

handing the at least two stacks to a stack gripper;

conveying one of the at least two stacks onto a placement means;

subsequently conveying another of the at least two stacks to a further placement means;

subsequently moving both of the at least two stacks simultaneously onto support elements of the stack gripper by an expulsion device of the transfer unit; and laterally aligning at least one of the two stacks received by the transfer unit by pressing elements of the transfer unit arranged on either side of the placement means for being shifted toward the stacks before the actuation of the expulsion device.

7. A method in accordance with claim 6, further comprising providing two respective laterally deliverable pressing elements on a carriage of the transfer unit for each of the at least two stacks, wherein one of the at least two stacks is held tight by two pressing elements during the movement of the carriage.

* * * * *